United States Patent
Sekiguchi

(10) Patent No.: US 8,745,210 B2
(45) Date of Patent: Jun. 3, 2014

(54) MIGRATION CONTROL APPARATUS AND MIGRATION CONTROL METHOD

(75) Inventor: Atsuji Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 12/976,560

(22) Filed: Dec. 22, 2010

(65) Prior Publication Data
US 2011/0161491 A1 Jun. 30, 2011

(30) Foreign Application Priority Data
Dec. 25, 2009 (JP) ................. 2009-295915

(51) Int. Cl.
*G06F 15/173* (2006.01)
*G06F 15/16* (2006.01)

(52) U.S. Cl.
USPC .......................... 709/224; 709/226

(58) Field of Classification Search
CPC ..................................... G06F 12/15
USPC ............ 709/223–226; 714/47.1; 718/1
See application file for complete search history.

(56) References Cited

U.S. PATENT DOCUMENTS

| | | | | |
|---|---|---|---|---|
| 7,925,923 B1 * | 4/2011 | Hyser et al. | .................. | 714/13 |
| 8,185,893 B2 * | 5/2012 | Hyser et al. | .................. | 718/1 |
| 8,201,166 B2 * | 6/2012 | Garrett et al. | .................. | 718/1 |
| 8,230,069 B2 * | 7/2012 | Korupolu | .................. | 709/226 |
| 8,578,076 B2 * | 11/2013 | van der Linden et al. | ...... | 710/72 |
| 2004/0143664 A1 * | 7/2004 | Usa et al. | .................. | 709/226 |
| 2009/0077383 A1 * | 3/2009 | de Monseignat et al. | ..... | 713/175 |
| 2009/0228589 A1 * | 9/2009 | Korupolu | .................. | 709/226 |
| 2010/0211956 A1 * | 8/2010 | Gopisetty et al. | .......... | 718/104 |
| 2010/0293412 A1 * | 11/2010 | Sakaguchi et al. | ......... | 714/17 |
| 2010/0306381 A1 * | 12/2010 | Lublin et al. | ............... | 709/226 |

FOREIGN PATENT DOCUMENTS

JP 2008-217302 A 9/2008

* cited by examiner

*Primary Examiner* — Asad Nawaz
*Assistant Examiner* — Berhanu Belete
(74) *Attorney, Agent, or Firm* — Fujitsu Patent Center

(57) ABSTRACT

A migration control apparatus for controlling migration of a virtual machine includes a monitoring section, a planning section, a time estimation section, a comparing section, and a plan execution section. The monitoring section monitors a status of a current migration of the virtual machine running on a first physical machine. The planning section makes, on the basis of the status of the current migration, a new migration plan for migrating the virtual machine. The time estimation section estimates a first migration time required to perform a new migration. The comparing section compares the first migration time with a second migration time to determine which migration will be completed earlier. The second migration time is an estimated time required to complete the current migration. The plan execution section performs the new migration when it has been determined that the new migration will be completed earlier.

6 Claims, 18 Drawing Sheets

FIG. 4

| TARGET VM (401) | SOURCE PM (402) | DESTINATION PM (403) | MIGRATION CONDITION (404) | PREREQUISITE (405) | STATUS AFTER COMPLETION (406) |
|---|---|---|---|---|---|
| VM 31 | SERVER 3 | SERVER 1 | SERVER 1<br>SERVER 3 | - | TERMINATION OF VM 31 |
| VM 41 | SERVER 4 | SERVER 2 | SERVER 2<br>SERVER 4 | - | TERMINATION OF VM 41 |
| VM 42 | SERVER 4 | SERVER 1 | SERVER 1<br>SERVER 4 | TERMINATION OF VM 41 | TERMINATION OF VM 42 |

FIG. 5

| PM ID (501) | SERVER 1 | | SERVER 2 | | SERVER 3 | SERVER 4 | |
|---|---|---|---|---|---|---|---|
| PM CAPACITY [GB] (502) | 9 | | 9 | | 9 | 9 | |
| VM ID (503) | VM 11 | VM 12 | VM 21 | VM 22 | VM 31 | VM 41 | VM 42 |
| VM CAPACITY [GB] (504) | 2 | 2 | 3 | 2 | 3 | 2 | 2 |
| NECESSARY TIME [sec] (505) | 118 | 118 | 176 | 118 | 176 | 118 | 118 |
| NECESSARY POWER (506) | 4+M | | 5+M | | 3+M | 4+M | |

FIG. 6

| PM IN USE (601) |
|---|
| SERVER 1 |
| SERVER 3 |

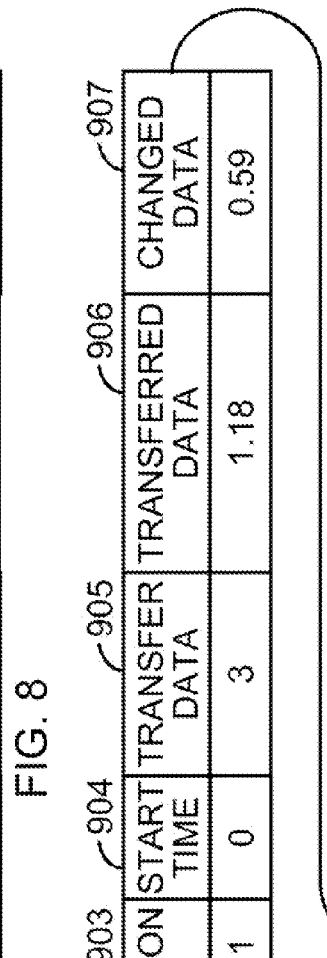

| 501 PM ID | 502 PM CAPACITY [GB] | | 503 VM ID | 504 VM CAPACITY [GB] | 505 NECESSARY TIME [sec] | 506 NECESSARY POWER |
|---|---|---|---|---|---|---|
| SERVER 1 | 9 | | VM 11 | 2 | 118 | 4+M |
| | | | VM 12 | 2 | 118 | |
| SERVER 2 | 9 | | VM 21 | 3 | 176 | 7+M |
| | | | VM 22 | 2 | 118 | |
| | | | VM 41 | 2 | 118 | |
| SERVER 3 | 9 | | VM 31 | 3 | 600 | 3+M |
| SERVER 4 | 9 | | VM 42 | 2 | 118 | 2+M |

FIG. 10

| 401 TARGET VM | 402 SOURCE PM | 403 DESTINATION PM | 404 MIGRATION CONDITION | 405 PREREQUISITE | 406 STATUS AFTER COMPLETION |
|---|---|---|---|---|---|
| VM 42 | SERVER 4 | SERVER 2 | SERVER 2 SERVER 4 | - | TERMINATION OF VM 42 |

FIG. 11

| 1501 | 1502 | 1503 | 1504 | 1505 | 1506 | 1507 |
|---|---|---|---|---|---|---|
| TARGET VM | SOURCE PM | DESTINATION PM | START TIME | TRANSFER DATA | TRANSFERRED DATA | CHANGED DATA |
| VM 31 | SERVER 3 | SERVER 1 | 0 | 3 | - | - |

FIG. 15

MIGRATION CONTROL APPARATUS AND MIGRATION CONTROL METHOD

CROSS-REFERENCE TO RELATED APPLICATION

This application is based upon and claims the benefit of priority of the prior Japanese Patent Application No. 2009-295915, filed on Dec. 25, 2009, the entire contents of which are incorporated herein by reference.

FIELD

The embodiments discussed herein are related to a migration control apparatus and a migration control method for controlling migration of a virtual machine.

BACKGROUND

In recent years, the virtual machine (also referred to as a VM) system in which a plurality of virtual machines run on a plurality of physical machines (also referred to as PMs) has become used. In such a system, there is a technique called live migration which allows migration of a VM, which is providing a service, running on a PM to another PM almost without stopping the service.

Operations in the live migration will be specifically discussed with reference to FIGS. 22 and 23. FIG. 22 illustrates an example of a conventional live migration. As illustrated in FIG. 22, a server 2201, which is a PM, has a VM management section 2219. A VM 2211 and a VM 2212 are running on the server 2201 under management of the VM management section 2219. A server 2202, which is a PM, has a VM management section 2229. A VM 2221 is running on the server 2202 under management of the VM management section 2229. Operations of the live migration will be discussed in which the VM 2212 running on the server 2201 is migrated via a network 2200 to be a VM 2222 running on the server 2202.

FIG. 23 illustrates an example of operations in a conventional live migration.

In operation S2301, memory data of the source VM 2212 is copied into a memory of the destination VM 2222. Specifically, the server 2201 transfers the memory data of the source VM 2212 to the server 2202 and the server 2202 stores the received data in the memory of the destination VM 2222.

In operation S2302, there has been a change in the memory data of the source VM 2212 while copying in the operation S2301, and expected transfer time of the changed memory data is more than one second, so that the changed memory data of the source VM 2212 is copied into the memory of the destination VM 2222.

In operation S2303, there has been a further change in the memory data of the source VM 2212 while copying in the operation S2302, and expected transfer time of the changed memory data is more than one second, so that the changed memory data of the source VM 2212 is copied into the memory of the destination VM 2222.

In operation S2304, there has been a further change in the memory data of the source VM 2212 while copying in the operation S2303, and expected transfer time of the changed memory data is one second or less, so that the server 2201 terminates the source VM 2212 and the changed memory data of the source VM 2212 is copied into the memory of the destination VM 2222.

In operation S2305, the server 2202 runs the destination VM 2222.

Resources such as a central processing unit (CPU) and network bandwidth are used in the live migration, so that a necessary time from the start to the end of the live migration depends on an amount of memory data to be copied, an available CPU usage rate, network bandwidth, and so on. When a plurality of live migrations are performed together, taking account of competition among the resources and necessary times, a deployment plan that specifies a sequence of live migrations is made in advance, and the live migrations are performed in accordance with the deployment plan.

A related technique is disclosed in Japanese Laid-open Patent Publication No. 2008-217302.

SUMMARY

According to an aspect of the present invention, provided is a migration control apparatus for controlling migration of a virtual machine. The migration control apparatus includes a monitoring section, a planning section, a time estimation section, a comparing section, and a plan execution section. The monitoring section monitors a status of a current migration of the virtual machine running on a first physical machine. The current migration is performed in accordance with a current migration plan. The planning section makes, on the basis of the status of the current migration, a new migration plan for migrating the virtual machine from the first physical machine to a second physical machine. The time estimation section estimates a first migration time required to perform a new migration in accordance with the new migration plan. The comparing section compares the first migration time with a second migration time to determine which migration will be completed earlier between the new migration and the current migration. The second migration time is an estimated time required to complete the current migration. The plan execution section performs the new migration when it has been determined that the new migration will be completed earlier.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a deployment plan table according to an embodiment of the present invention;

FIG. 5 is a diagram illustrating an example of a resource status table according to an embodiment of the present invention;

FIG. 6 is a diagram illustrating an example of a list of PMs in use according to an embodiment of the present invention;

FIG. 7 is a diagram illustrating an example of an overall monitor list according to an embodiment of the present invention;

FIG. 8 is a diagram illustrating an example of a progress report according to an embodiment of the present invention;

FIG. 9 is a diagram illustrating an example of an expected necessary time table according to an embodiment of the present invention;

FIG. 10 is a diagram illustrating an example of a resource status table according to an embodiment of the present invention;

FIG. 11 is a diagram illustrating an example of a deployment plan according to an embodiment of the present invention;

FIG. 15 is a diagram illustrating an example of a monitor list according to an embodiment of the present invention;

DESCRIPTION OF EMBODIMENTS

While a live migration is being performed in accordance with the deployment plan made in advance, a problem may occur such that a time required to migrate a VM increases when the number of users using the server or the usage amount of services varies significantly. When the number of users or the usage amount of services varies significantly, in many cases, the transfer throughput may decrease and the amount of memory data to be transferred may increase, so that a time required for performing live migration may increase. Therefore, when a large scale deployment plan targeting a large number of VMs is executed in a situation in which the number of users or the usage amount of services varies significantly, delays in live migrations of respective VMs are accumulated, and thus a large delay may occur as a whole.

Therefore, it is preferable to provide a technique that may shorten a time required to migrate a VM even in a situation in which the number of users or the usage amount of services varies significantly.

The migration control apparatus according to the embodiments of this application may shorten a time required to migrate a VM even in a situation in which the number of users or the usage amount of services varies significantly.

Hereinafter, the embodiments will be discussed with reference to the drawings.

First Embodiment

Figure 1:
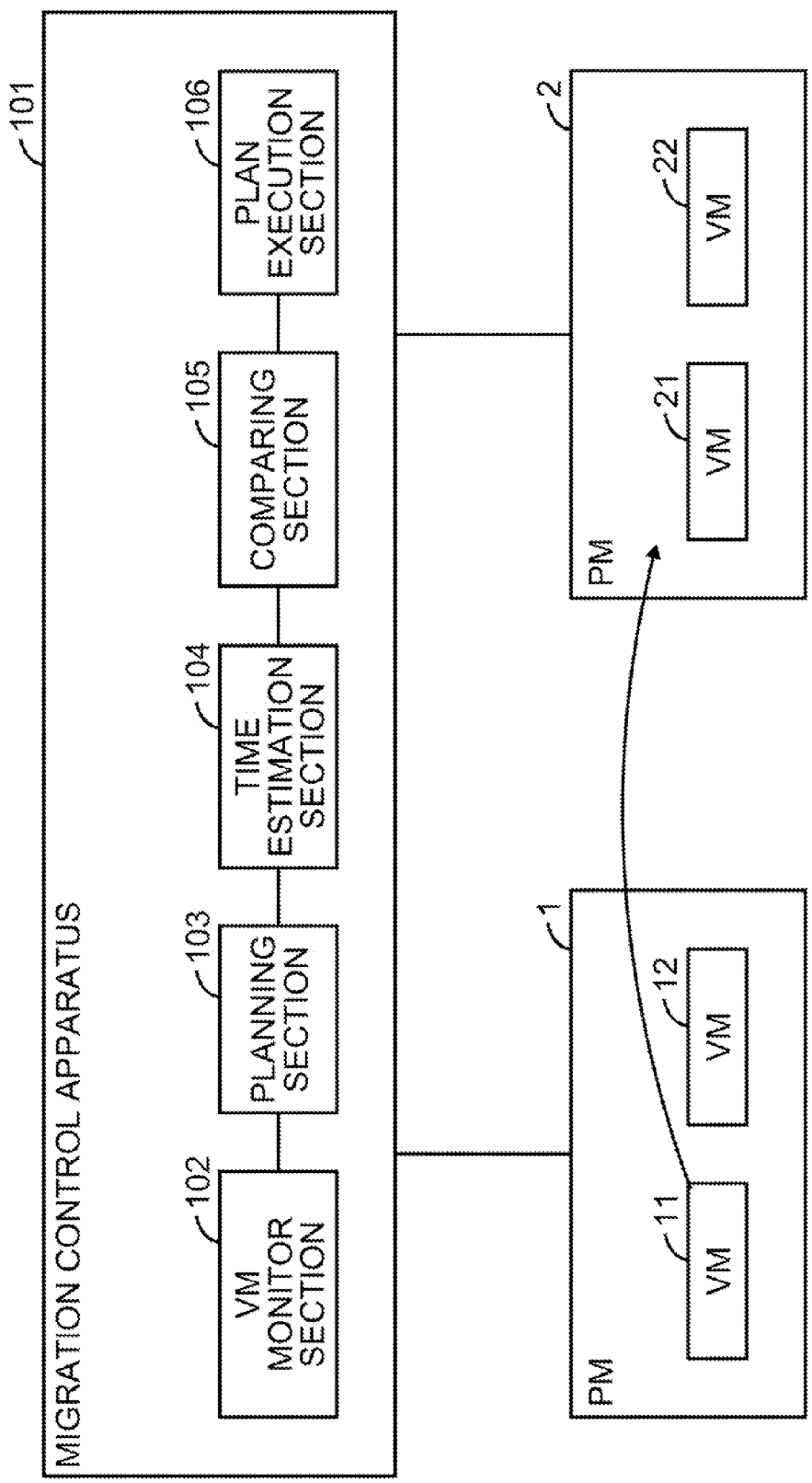
FIG. 1 is a diagram illustrating an exemplary configuration of a migration control apparatus according to an embodiment of the present invention.

FIG. 1 illustrates an exemplary configuration of a migration control apparatus 101 according to a first embodiment. The configuration of the migration control apparatus 101 according to the present embodiment will be discussed with reference to FIG. 1. As illustrated in FIG. 1, the migration control apparatus 101 is connected to a PM 1 and a PM 2, and VMs are running on the PM 1 and the PM 2.

The migration control apparatus 101 includes a VM monitor section 102, a planning section 103, a time estimation section 104, a comparing section 105, and a plan execution section 106. A VM 11 and a VM 12 are running on the PM 1. A VM 21 and a VM 22 are running on the PM 2. FIG. 1 illustrates an example of a case in which the VM 11 migrates from the PM 1 to the PM 2.

The VM monitor section 102 monitors a migration status of the VM 11 running on the PM 1. The planning section 103 makes a new migration plan for migrating the VM 11 from the PM 1 to the PM 2 in accordance with the migration status monitored by the VM monitor section 102. The time estimation section 104 estimates a migration time which is the time required for the VM 11 to migrate from the PM 1 to PM 2 when the new migration plan is executed.

The comparing section 105 compares the migration time estimated by the time estimation section 104 and a migration time in a current migration plan that is being executed, and determines which finish time is earlier between the new migration plan and the current migration plan. When a comparison result of the comparing section 105 indicates that the finish time of the migration according to the new migration plan is earlier than the finish time of the migration according to the current migration plan, the plan execution section 106 executes the new migration plan.

In summary, the migration control apparatus 101 dynamically monitors the migration status of the VM when the VM migrates, estimates the time required for the migration of the VM, and changes the migration plan of the VM depending on the situation. As a result, it is possible to shorten the time required to migrate the VM even in a situation in which the number of users or the usage amount of services varies significantly.

Second Embodiment

Figure 2:
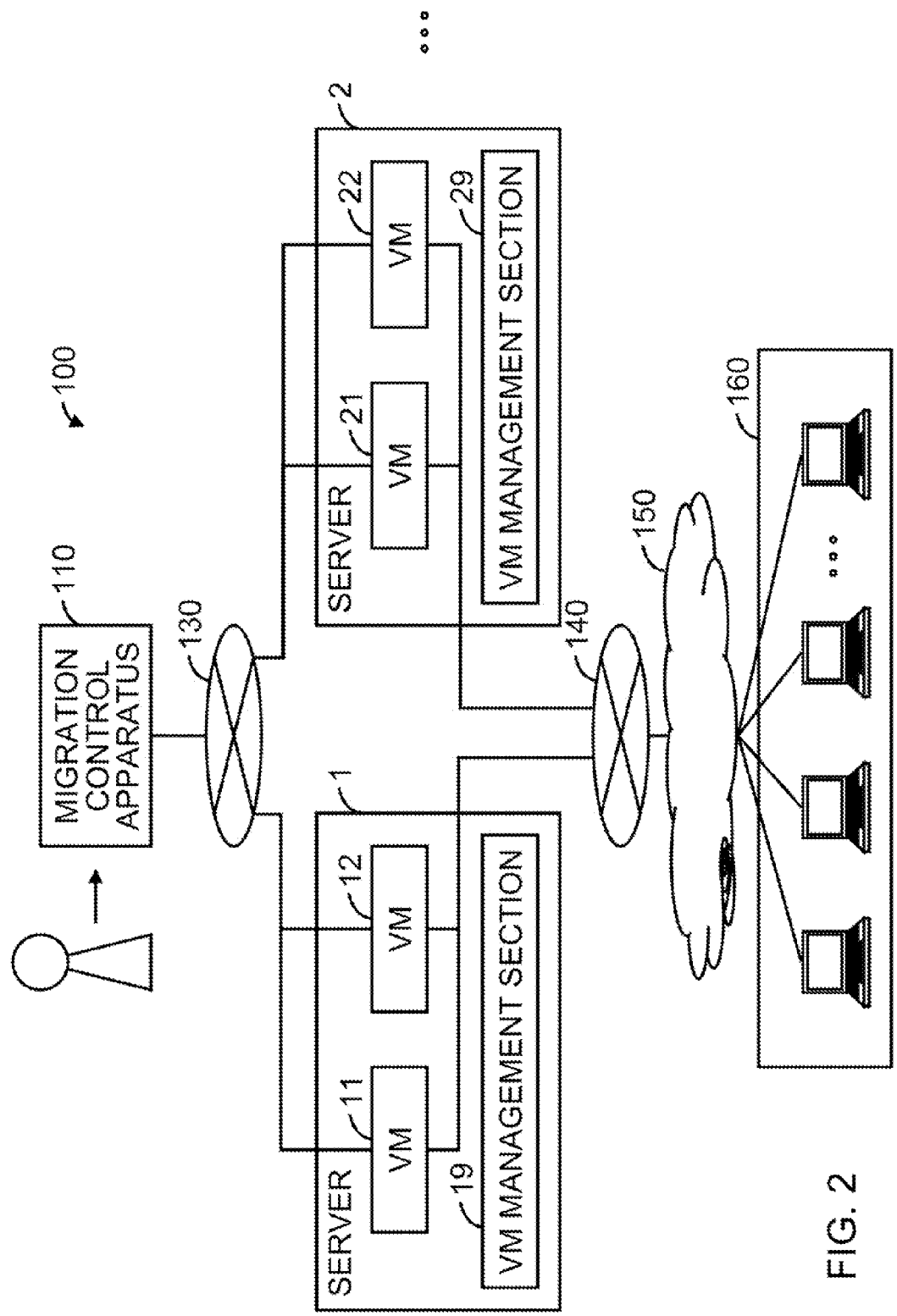
FIG. 2 is a diagram illustrating an exemplary configuration of a VM system according to an embodiment of the present invention.

FIG. 2 illustrates an exemplary configuration of a VM system 100 according to a second embodiment. The configuration of the VM system 100 will be discussed with reference to FIG. 2. As illustrated in FIG. 2, the VM system 100 includes a migration control apparatus 110, a plurality of servers 1, 2, and so forth, and user terminals 160. In the VM system 100, the migration control apparatus 110 and the plurality of servers 1, 2, and so forth are connected to each other via a management network 130, and the plurality of servers 1, 2, and so forth and the user terminals 160 are connected to each other via a service network 140 and the Internet 150.

The migration control apparatus 110 performs a live migration of a VM from a PM to another PM almost without stopping the service provided by the VM. Specifically, when the migration control apparatus 110 performs a plurality of live migrations together, the migration control apparatus 110 makes in advance, while taking account of competition among the resources and necessary times, a deployment plan that specifies a sequence of live migrations, and performs the live migrations in accordance with the deployment plan. The configuration and operations of the migration control apparatus 110 will be discussed in detail below.

The server 1 includes a VM management section 19. The VM 11 and the VM 12 are running on the server 1 under management of the VM management section 19. The server 2 includes a VM management section 29. The VM 21 and the VM 22 are running on the server 2 under management of the VM management section 29. The servers 1, 2 provide a service to the user terminals 160 via the service network 140 and the Internet 150. The user terminals 160 request the servers 1, 2 to provide a service, and receive the service from the servers 1, 2.

Figure 3:
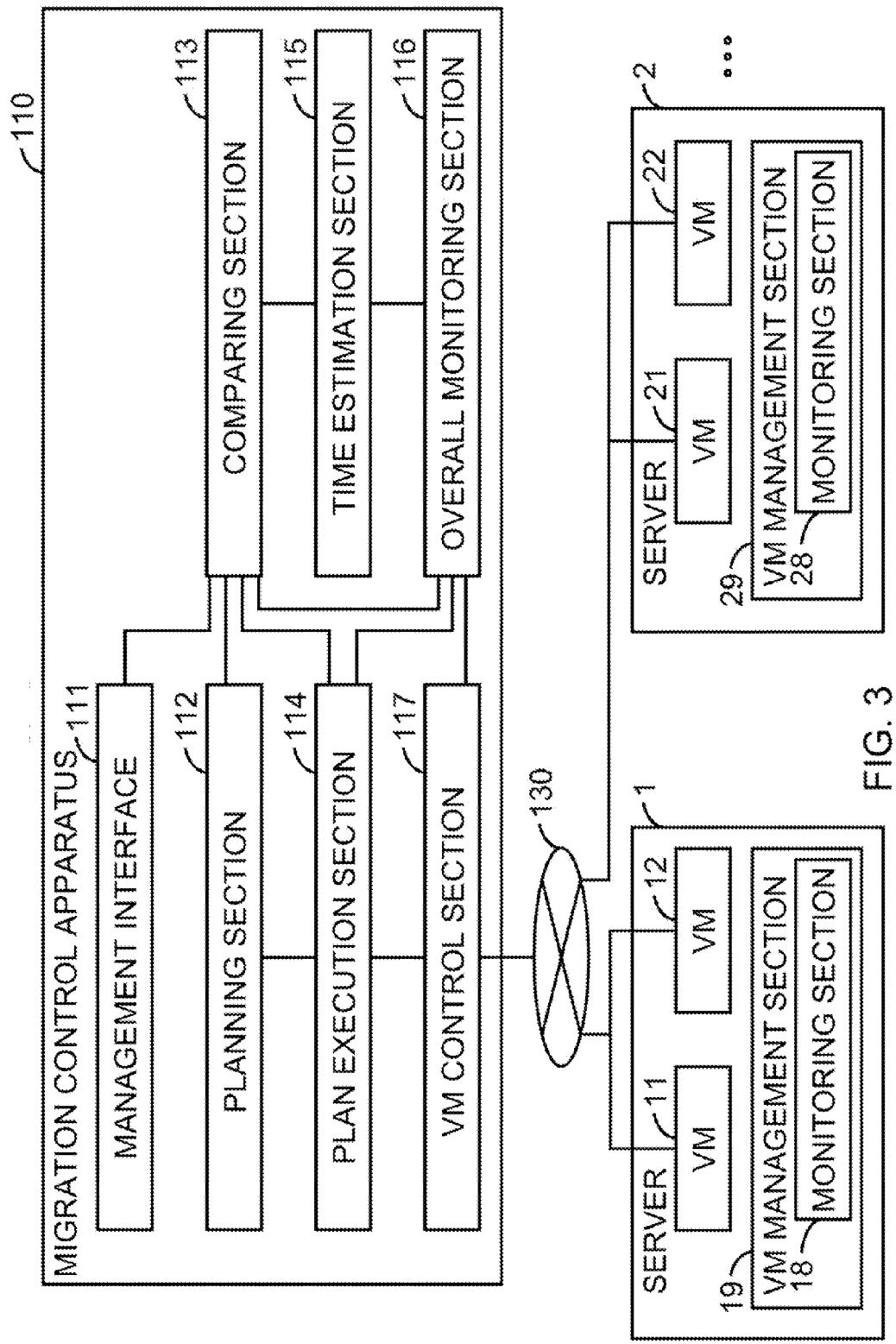
FIG. 3 is a diagram illustrating an exemplary configuration of a migration control apparatus according to an embodiment of the present invention.

FIG. 3 illustrates an exemplary configuration of the migration control apparatus 110 according to the present embodiment. The configuration of the migration control apparatus 110 will be discussed with reference to FIG. 3. As illustrated in FIG. 3, the migration control apparatus 110 includes a management interface 111, a planning section 112, a comparing section 113, a plan execution section 114, a time estimation section 115, an overall monitoring section 116, and a VM control section 117. The migration control apparatus 110 is connected to a plurality of servers 1, 2, and so forth via the management network 130.

The management interface 111 receives an instruction of deployment request from an administrator. Upon receiving the instruction of deployment request from the administrator, the management interface 111 notifies the comparing section 113 of the deployment request.

The planning section 112 makes a deployment plan including a plurality of migration plans each for migrating a VM from a server on which the VM is currently running to another server on the basis of information on the monitored VM. Upon receiving a deployment plan request from the comparing section 113, the planning section 112 makes a deployment plan for reducing power consumption and shortening deployment time, and notifies the comparing section 113 of a deployment plan report.

FIG. 5 illustrates an example of a resource status table in an initial state. The resource status table in the initial state will be discussed with reference to FIG. 5. As illustrated in FIG. 5, the resource status table includes "PM ID" 501, "PM capacity" 502, "VM ID" 503, "VM capacity" 504, "necessary time" 505, and "necessary power" 506. The "PM ID" 501 indicates identification information (ID) for identifying each PM. The "PM capacity" 502 indicates the memory capacity of each PM. The "VM ID" 503 indicates an ID for identifying a VM running on each PM. The "VM capacity" 504 indicates the memory capacity required by each VM. The "necessary time" 505 indicates an estimated time required for migrating each VM. The "necessary power" 506 indicates the estimated amount of electric power used by each PM.

According to the resource status table illustrated in FIG. 5, the PM capacity of the server 1 is 9 GB. The VMs on the server 1 are VM 11 and VM 12. The VM capacities of the VM 11 and the VM 12 are 2 GB each. The estimated times required for migrating the VM 11 and the VM 12 are 118 seconds each. The estimated amount of power used by the server 1 is 4+M. The estimated amount of power used by a PM is a sum of a value proportional to a used memory capacity and a constant amount M. Due to the constant amount M, power consumption may be reduced by migrating VMs such that the VMs are aggregated in a smaller number of PMs as far as possible to terminate PMs on which no VM is running. For example, when an ordinary personal computer (PC) consumes power of 140 W in an idle state and 240 W in a high load state, it results in M=140 W. In other words, about 60% of power is consumed by there is only a power supply of the PC, so that this power consumption may be eliminated if the PC is shut down.

The planning section 112 refers to the resource status table in the initial state illustrated in FIG. 5, makes a deployment plan, and creates a deployment plan table. For example, in the resource status table in the initial state, the total amount of VM capacities of all the VMs is 2+2+3+2+3+2+2=16, and the capacity of each PM is 9, so that the planning section 112 makes a new deployment plan in which the VMs are packed into two PMs to reduce power consumption. Among from many packing manners, the planning section selects, to make a deployment plan with a shorter deployment time which is the time for completing all the migrations, a manner such that selecting VMs requiring short migration time to decrease the total number of migrations and migrating many VMs in parallel. For example, in the example of FIG. 5, it may be effective that, first, migrating VM 31 to another PM, and next, migrating VM 11 and VM 12, or VM 41 and VM 42 to another PM.

FIG. 4 illustrates an example of the deployment plan table. The deployment plan table will be discussed with reference to FIG. 4. As illustrated in FIG. 4, the deployment plan table includes "target VM" 401, "source PM" 402, "destination PM" 403, "condition" 404, "prerequisite" 405, and "status after completion" 406. The "target VM" 401 indicates an ID for identifying a VM to be migrated. The "source PM" 402 indicates an ID for identifying a PM from which the VM is migrated. The "destination PM" 403 indicates an ID for identifying a PM to which the VM is migrated. The "condition" 404 indicates a condition for migrating the VM. For example, when the "migration condition" 404 includes "server 1, server 3", it is indicated that the VM may be migrated when no migration related to the server 1 or the server 3 is performed.

The "prerequisite" 405 indicates a condition that must be satisfied when the VM is migrated. The "status after completion" 406 indicates a status established after the migration has been completed. Before the target VM is migrated, the "migration condition" 404 and the "prerequisite" 405 need to be satisfied. For example, with respect to VM 42, the "migration condition" 404 includes "server 1, server 4", and the "prerequisite" 405 includes "termination of VM 41". Therefore, the VM 42 may be migrated when no migration related to the server 1 or the server 4 is executed and the VM 41 has been terminated.

The comparing section 113 compares an estimated deployment time and a deployment time in a current deployment plan, and determines which is earlier between a finish time of the deployment according to the new deployment plan and a finish time of the deployment according to the current deployment plan. Specifically, upon receiving a deployment request from the management interface 111, the comparing section 113 notifies the planning section 112 of a resource status table along with a deployment plan request, and thereafter receives a deployment plan report from the planning section 112.

When there is a current deployment plan that is already being executed, the comparing section 113 notifies the time estimation section 115 of a necessary time estimation request, receives an estimated necessary time report, compares the new deployment plan and the current deployment plan, and determines which deployment plan is better. The operations for comparing the new deployment plan and the current deployment plan to determine which deployment plan is better will be specifically discussed. The comparing section 113 calculates the time for completion of the entire deployment when the current deployment plan is executed without change, receives the new deployment plan from the planning section 112, and calculates the time for completion of the entire deployment in the new deployment plan. The comparing section 113 calculates, for both deployment plans, the finish time of the entire deployment on the basis of the time for completion of the entire deployment, and determines that the deployment plan whose finish time of the entire deployment is earlier is better.

When the comparing section 113 determines that the new deployment plan is better, the comparing section 113 issues a deployment cancel request to the plan execution section 114 to cancel the current deployment plan. Further, if a live migration that is being performed needs to be canceled, the comparing section 113 notifies the overall monitoring section 116 of a migration cancel request. Thereafter, the comparing section 113 notifies the plan execution section 114 of a deployment request in accordance with the new deployment plan.

When the finish time of the deployment according to the new deployment plan is earlier than the finish time of the deployment according to the current deployment plan, the plan execution section 114 executes the new deployment plan. Specifically, upon receiving the deployment request from the comparing section 113, the plan execution section 114 performs a live migration at the ready, which is included in the deployment plan, through the VM control section 117, and notifies the overall monitoring section 116 of a monitor addition request.

The plan execution section 114 sequentially retrieves the target VM of the deployment plan in FIG. 4 from the top. First, with respect to VM 31, the migration condition is satisfied because no VM has been migrated, and there is no prerequisite, so that it is determined that the migration of VM 31 is ready. The plan execution section 114 adds the server 1 and the server 3 in the list of PMs in use because the server 1 and the server 3 are used, performs the migration of the VM 31 through the VM control section 117, and notifies the overall monitoring section 116 of a monitor addition request.

FIG. 6 illustrates an example of the list of PMs in use. The list of PMs in use will be discussed with reference to FIG. 6. As illustrated in FIG. 6, the list of PMs in use includes "PM in use" 601 indicating IDs for identifying servers that are the source PM and the destination PM in the migration of the VM currently migrated.

Upon receiving a migration completion report, the plan execution section 114 tries to perform the next live migration. Upon receiving a deployment cancel request, the plan execution section 114 cancels the live migration being performed, discards the deployment plan, and terminates the deployment.

The overall monitoring section 116 monitors information related to a VM running on a predetermined server. Specifically, the overall monitoring section 116 dynamically obtains and aggregates an amount of transferred data, an amount of changed data, and an elapsed time of the VM during the live migration. Upon receiving a monitor addition request, the overall monitoring section 116 adds information related to the target VM in an overall monitor list and notifies a monitor start request to a monitoring section 18, 28, and so forth included in the VM management section 19, 29, and so forth, respectively, of the PM on which the target VM is running. The monitoring section adds the information related to the target VM to a monitor list.

The overall monitor list and the monitor list will be discussed with reference to FIGS. 7 and 15. FIG. 7 illustrates an example of the overall monitor list. As illustrated in FIG. 7, the overall monitor list includes "target VM" 701, "source PM" 702, "destination PM" 703, "start time" 704, "transfer data" 705, "transferred data" 706, and "changed data" 707. The "target VM" 701 indicates an ID for identifying a VM to be monitored. The "source PM" 702 indicates an ID for identifying a PM from which the VM is migrated. The "destination PM" 703 indicates an ID for identifying a PM to which the VM is migrated. The "start time" 704 indicates the time when the migration starts. The "transfer data" 705 indicates the amount of data to be transferred. The "transferred data" 706 indicates the amount of data that has already been transferred. The "changed data" 707 indicates the amount of data, out of the transfer data, that has been changed. FIG. 15 illustrates an example of the monitor list. As illustrated in FIG. 15, the monitor list includes "target VM" 1501, "source PM" 1502, "destination PM" 1503, "start time" 1504, "transfer data" 1505, "transferred data" 1506, and "changed data" 1507. The "target VM" 1501 indicates an ID for identifying a VM to be monitored. The "source PM" 1502 indicates an ID for identifying a PM from which the VM is migrated. The "destination PM" 1503 indicates an ID for identifying a PM to which the VM is migrated. The "start time" 1504 indicates the time when the migration starts. The "transfer data" 1505 indicates the amount of data to be transferred. The "transferred data" 1506 indicates the amount of data that has already been transferred. The "changed data" 1507 indicates the amount of data, out of the transfer data, that has been changed. The configuration of the monitor list is similar to that of the overall monitor list. While the overall monitor list includes information related to every target VM, the monitor list includes information related to only the target VMs running on each PM. The initial value of the "transfer data" 1505 is the same as the VM capacity of the target VM. In each migration, a plurality of copies are performed until the migration is completed. The "transfer data" 1505 is updated every time each of the plurality of copies is started, and the "start time" 1504 is also changed to the current time. Upon receiving a progress report request from the overall monitoring section 116, the monitoring section aggregates progress data of each target VM and updates the "transferred data" 1506 and the "changed data" 1507 in the monitor list at the time. The monitoring section notifies the overall monitoring section 116 of the updated monitor list as the progress report. The overall monitoring section 116 reflects the information of the target VMs included in the received progress report to the overall monitor list.

Upon receiving a progress report request from the time estimation section 115, the overall monitoring section 116 returns a progress report to the time estimation section 115. FIG. 8 illustrates an example of the progress report. The progress report will be discussed with reference to FIG. 8. As illustrated in FIG. 8, the progress report includes "target VM" 801, "source PM" 802, "destination PM" 803, "start time" 804, "transfer data" 805, "transferred data" 806, and "changed data" 807. The configuration of the progress report is similar to that of the overall monitor list and the monitor list. While the progress report returned from the overall monitoring section 116 to the time estimation section 115 includes information related to all the target VMs, the progress report returned from the monitoring section to the overall monitoring section 116 includes information related to only the target VMs running on each PM.

Upon receiving a migration completion report, the overall monitoring section 116 deletes the information related to the target VM from the overall monitor list and notifies the plan execution section 114 of a migration completion report. Upon receiving a migration cancel request, the overall monitoring section 116 notifies the migration cancel request to the monitoring section included in the VM management section that manages the target VM. Upon receiving a migration cancel report, the overall monitoring section 116 deletes the information related to the target VM from the overall monitor list.

When the new deployment plan is executed, the time estimation section 115 estimates, for each VM, a migration time which is the time required for the VM to migrate from a server on which the VM is currently running to another server. Specifically, upon receiving a necessary time estimation request, the time estimation section 115 notifies the overall monitoring section 116 of the progress report request. Upon receiving the progress report from the overall monitoring section 116, the time estimation section 115 estimates, for each VM, the necessary time on the basis of the amount of transfer data, the transfer throughput, and the amount of changed data of the memory, and notifies the comparing section 113 of an expected necessary time table.

The time estimation section 115 recalculates the necessary time in response to a predetermined trigger. For example, the time estimation section 115 may recalculate the necessary time at regular intervals. The time estimation section 115 may recalculate the necessary time when requested from an administrator to assign a new VM. The time estimation section 115 may recalculate the necessary time when the migration has been completed. In other words, before execution of the entire deployment plan has been completed, the time estimation section 115 recalculates the necessary time, when a predetermined trigger occurs, to estimate the finish time of the entire deployment in a case in which the current deployment plan is executed without change. At the same time, the time estimation section 115 makes a new deployment plan again, and estimates an expected finish time of the entire deployment according to the new deployment plan.

FIG. 9 illustrates an example of the expected necessary time table. The expected necessary time table will be discussed with reference to FIG. 9. As illustrated in FIG. 9, the expected necessary time table includes "target VM" 901, "source PM" 902, "destination PM" 903, "start time" 904, "transfer data" 905, "transferred data" 906, "changed data" 907, "throughput" 908, "change ratio" 909, "necessary time" 910, and "finish time" 911. The "target VM" 901 indicates an ID for identifying a VM to be monitored. The "source PM" 902 indicates an ID for identifying a PM from which the VM is migrated. The "destination PM" 903 indicates an ID for identifying a PM to which the VM is migrated. The "start time" 904 indicates the time when the migration starts. The "transfer data" 905 indicates the amount of data to be transferred. The "transferred data" 906 indicates the amount of data that has already been transferred. The "changed data" 907 indicates the amount of data, out of the transfer data, that has been changed. The "throughput" 908 indicates the transfer throughput. The "change ratio" 909 indicates the change ratio of the memory data. The "necessary time" 910 indicates the expected time required for the migration. The "finish time" 911 indicates the expected time when the migration has been completed.

The method for estimating the necessary time on the basis of the amount of transfer data, the transfer throughput, and the amount of changed data of the memory will be specifically discussed. Here, a case will be discussed in which the memory capacity of the destination VM is "2 GB", the memory change ratio is "25%", and the transfer throughput is "1 Gbps". The memory change ratio is a ratio of the amount of data changed during the transfer to the amount of the transferred data. Since all the memory "2 GB" is transferred at the first transfer, the time estimation section 115 estimates that the first transfer time required for the first transfer is 2 [GB]/1 [Gbps]=16 [sec], and estimates that the amount of changed data during the first transfer is 2 [GB]×25 [%]=512 [MB].

Regarding the second transfer, since the amount of changed data during the first transfer is 512 [MB], the time estimation section 115 determines that the amount of transfer data at the second transfer is 512 [MB]. The time estimation section 115 estimates that the second transfer time required for the second transfer is 512 [MB]/1 [Gbps]=4 [sec], and estimates that the amount of changed data during the second transfer is 512 [MB]×25 [%]=128 [MB].

Regarding the third transfer, since the amount of changed data during the second transfer is 128 [MB], the time estimation section 115 determines that the amount of transfer data at the third transfer is 128 [MB]. The time estimation section 115 estimates that the third transfer time required for the third transfer is 128 [MB]/1 [Gbps]=1 [sec], and estimates that the amount of changed data during the third transfer is 128 [MB]×25 [%]=32 [MB].

Regarding the fourth transfer, since the amount of changed data during the third transfer is 32 [MB], the time estimation section 115 determines that the amount of transfer data at the fourth transfer is 32 [MB]. The time estimation section 115 estimates that the fourth transfer time required for the fourth transfer is 32 [MB]/1 [Gbps]=0.25 [sec], and estimates that the amount of changed data during the fourth transfer is 32 [MB]×25 [%]=8 [MB]. When the amount of changed data becomes sufficiently small, the migration control apparatus 110 terminates the source VM, aggregates and transfers changed data, so that the time estimation section 115 terminates the estimation. In the above example, the necessary time is the sum of the first transfer time to the fourth transfer time, which is 16+4+1+0.25=21.25 [sec].

A generalized case of necessary time calculation will be discussed. First, it is assumed that the amount of transfer data is $Mr_1$, the transfer throughput is tp, and the memory change ratio is r at the present moment. In this case, the first transfer time $t_1$ is $t_1=Mr_1/tp$. The amount of changed data $Mr_2$ at this time is $Mr_2=Mr_1 \times r$. At the second transfer, the amount of transfer data is $Mr_2$, and the second transfer time $t_2$ is $t_2=Mr_2/tp$. The amount of changed data $Mr_3$ at this time is $Mr_3=Mr_2 \times r=Mr_1 \times r^2$.

Similarly, the i-th transfer time $t_i$ is $t_i=Mr_i/tp$, and the amount of changed data is $Mr_i=Mr_{i-1} \times r=Mr_{i-2} \times r \times r= \ldots =Mr_1 \times r^{i-1}$, so that $t_i$ is calculated by the expression (1) below. The necessary time T is the sum of the transfer times $t_1 \ldots t_i$, so that the necessary time T is calculated by the expression (2) below. When n approaches infinity, the necessary time T is calculated by the expression (3) below. In this way, by using the necessary time T=initial amount of transfer data/{transfer throughput×(1−memory change ratio)}, the necessary time may be estimated considering repetitive copies. The transfer throughput and the memory change ratio are not predetermined values, but they change dynamically during a live migration. Here, the transfer throughput is a value obtained by dividing the amount of transferred data by the elapsed time, and the memory change ratio is a value obtained by dividing the amount of changed data by the amount of transfer data.

$$t_i = \frac{Mr_1 \times r^{j-1}}{tp} \qquad (1)$$

$$T = \sum_{i=1}^{n} t_i = \sum_{i=1}^{n} \frac{Mr_1 \times r^{i-1}}{tp} = \frac{Mr_1}{tp} \times \frac{1-r^n}{1-r} \quad (2)$$

$$T = \frac{Mr_1}{tp(1-r)} \text{ when } n \to \infty \quad (3)$$

The VM control section 117 relays requests and reports among the plan execution section 114, the overall monitoring section 116, and each VM management section 19, 29, and so forth, and performs various controls of each VM 11, 12, 21, 22, and so forth.

In this way, the migration control apparatus 110 dynamically monitors the migration status of the VM when the VM migrates, estimates the time required for the migration of the VM, and changes the migration plan of the VM depending on the situation. As a result, it is possible to shorten the time required to migrate the VM even in a situation in which the number of users or the usage amount of services varies significantly.

Figure 12:
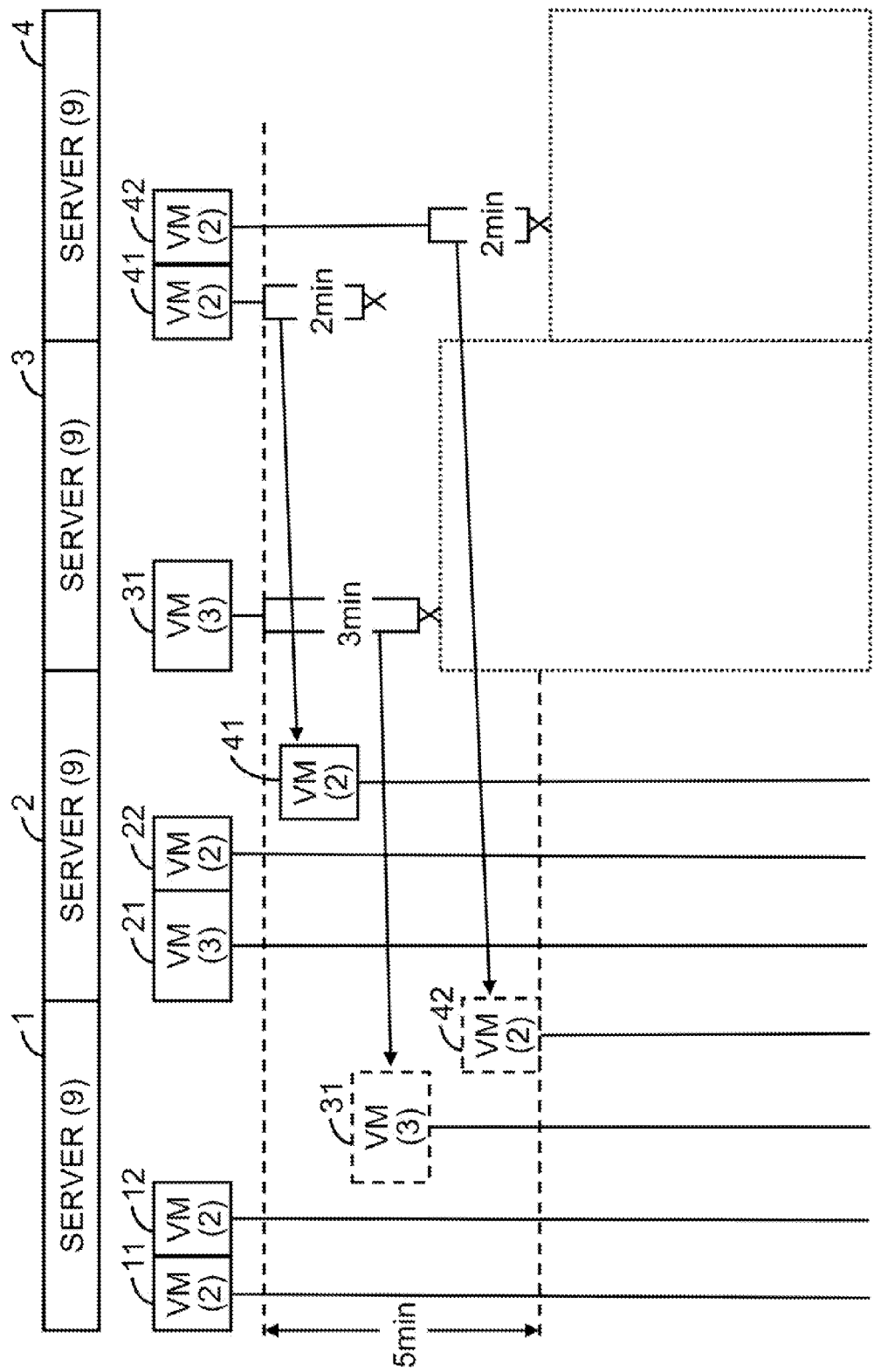
FIG. 12 is a diagram illustrating an exemplary estimation of a necessary time according to an embodiment of the present invention.
Figure 13:
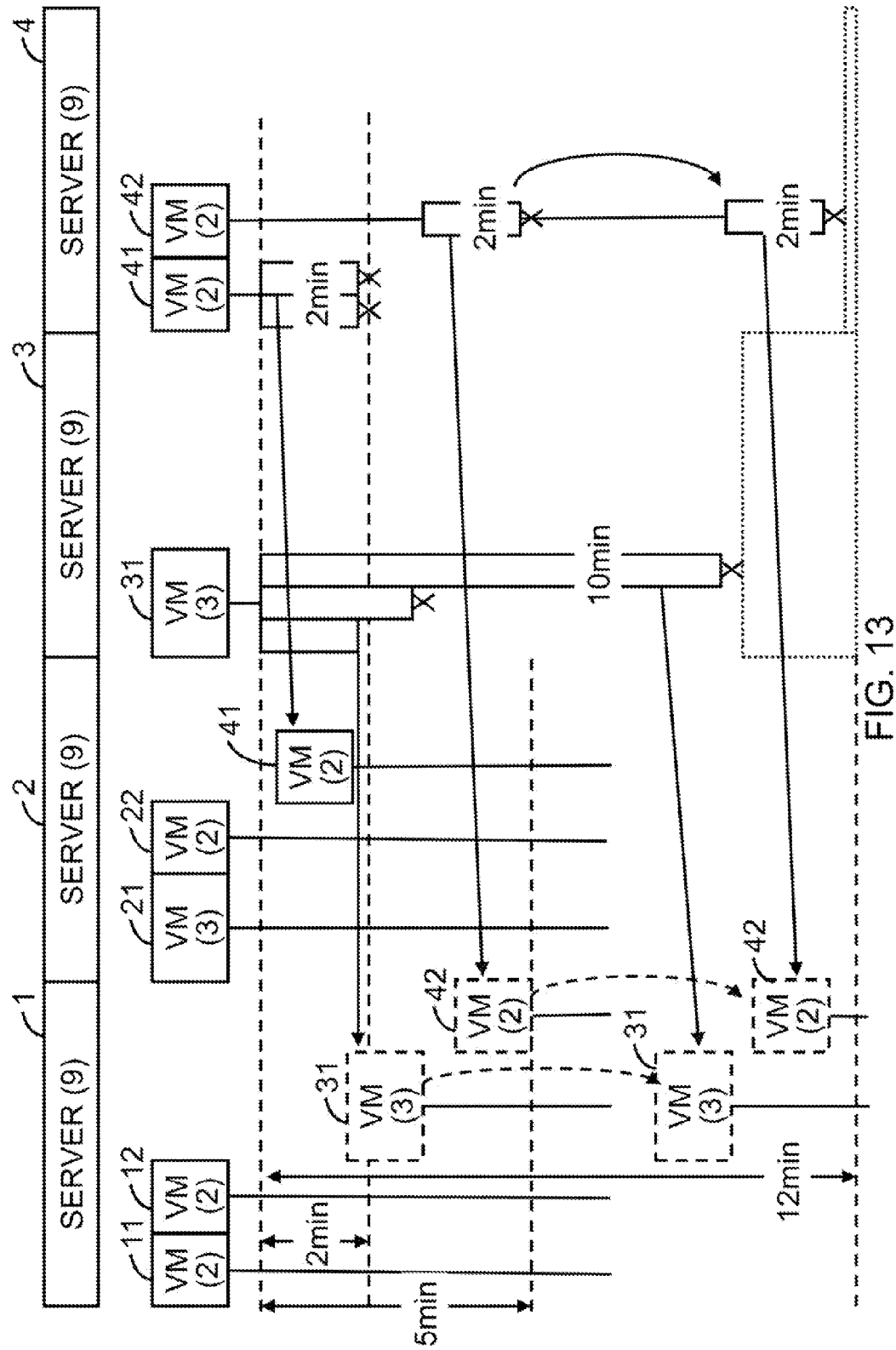
FIG. 13 is a diagram illustrating an exemplary estimation of a necessary time according to an embodiment of the present invention.
Figure 14:
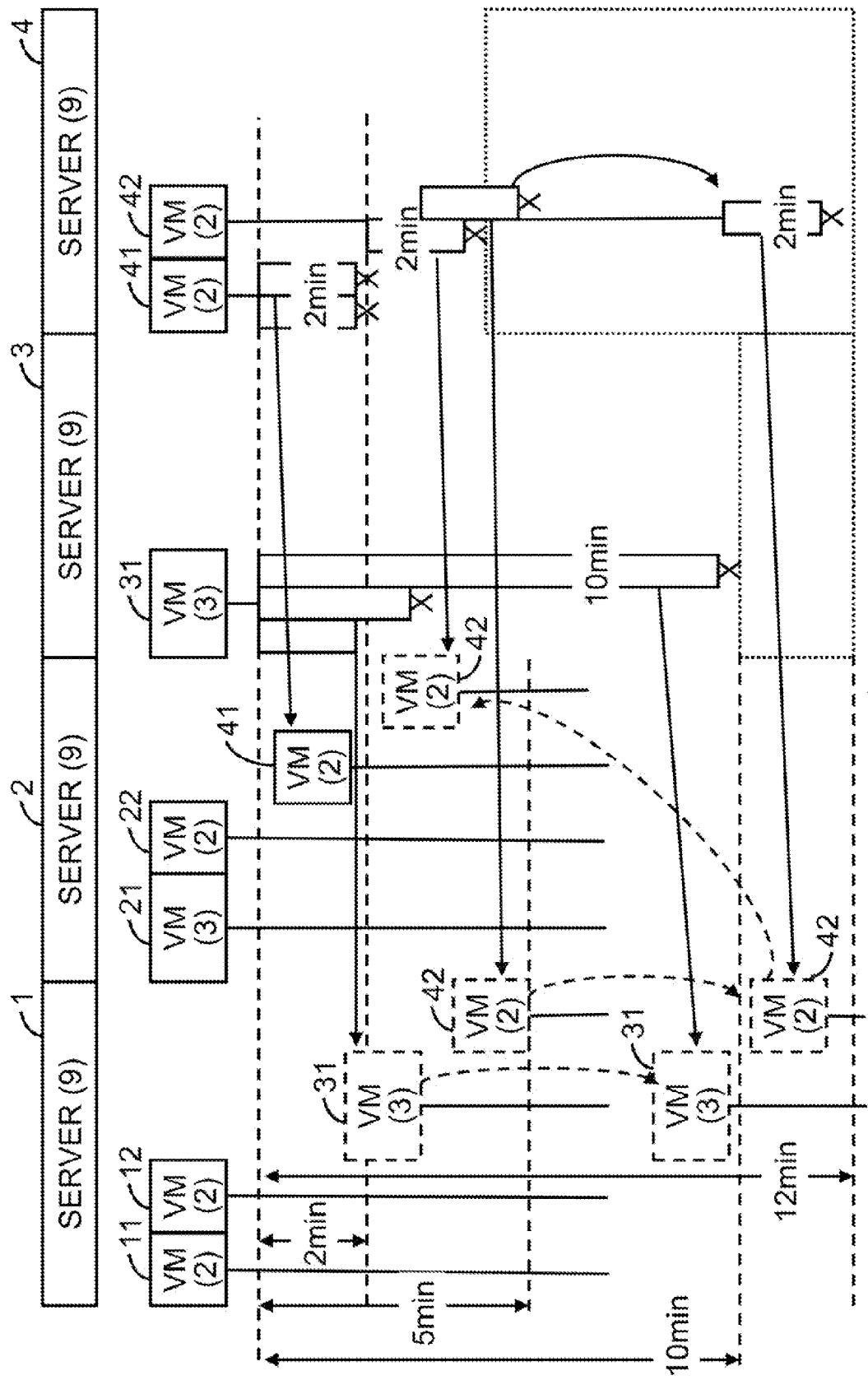
FIG. 14 is a diagram illustrating an exemplary estimation of a necessary time according to an embodiment of the present invention.

The necessary time for executing a deployment plan will be discussed with reference to FIGS. 10 to 14. FIG. 10 illustrates an example of a resource status table. FIG. 11 illustrates an example of a deployment plan. FIGS. 12 to 14 illustrate exemplary estimations of the necessary time when a deployment plan is executed. FIG. 12 illustrates an exemplary estimation of the necessary time when the deployment plan illustrated in FIG. 4 is executed. In FIG. 12, the vertical axis is the time axis. The solid line extended downward from each VM represents a VM lifeline indicating that the VM is running during the time period terminating at the end of the solid line.

As illustrated in FIG. 12, the deployment plan, executed by the migration control apparatus 110, for the VMs 11, 12, 21, 22, 31, 41, and 42 each running on one of the servers 1 to 4 includes migration of the VM 31 and the VM 41 to the server 1 and the server 2, respectively at the same time. The deployment plan also includes migration of the VM 42 to the server 1 after the migration of the VM 41.

The migration control apparatus 110 estimates that the necessary time for migrating the VM 31 is about 3 minutes. The migration control apparatus 110 estimates that the necessary time for migrating the VM 41 is about 2 minutes. The migration control apparatus 110 estimates that the necessary time for migrating the VM 42 is about 2 minutes. As a result, the migration control apparatus 110 calculates that the total necessary time for executing the deployment plan is about 5 minutes. When the migration is completed, the migration control apparatus 110 deletes the source VM.

FIG. 13 illustrates an exemplary estimation of the necessary time when the first migration is completed. As illustrated in FIG. 13, when the migration of the VM 41 from the server 4 to the server 2 is completed, i.e., 2 minutes after the execution of the deployment plan is started, the migration control apparatus 110 collects the amount of transferred data and the amount of changed data of the memory from each server, estimates the necessary time for each migration, and updates the resource status table. FIG. 10 illustrates an example of the resource status table after the VM 41 has been migrated. The migration control apparatus 110 updates the resource status table in the initial state illustrated in FIG. 5 to, for example, the resource status table illustrated in FIG. 10. As illustrated in FIG. 10, in the updated resource status table, the VM 41 is migrated from the server 4 to the server 2 and the necessary time of the VM 31 is changed to "600" seconds.

After updating the resource status table, the migration control apparatus 110 estimates the necessary time when the execution of the current deployment plan is continued. As a result, the migration control apparatus 110 estimates that the migration time of the VM 31 and the VM 42 is 10 minutes and 2 minutes, respectively, and estimates that the execution of the entire deployment plan will be completed in the total time of 12 minutes.

The migration control apparatus 110 makes a new deployment plan in accordance with the current situation. FIG. 11 illustrates an example of the new deployment plan. The migration control apparatus 110 makes, for example, the deployment plan illustrated in FIG. 11. Compared to the deployment plan illustrated in FIG. 4, the deployment plan illustrated in FIG. 11 includes the migration plan of the "VM 42" in which, the destination PM is "server 2" instead of "server 1" and the migration condition is "server 2, server 4" instead of "server 1, server 4". Furthermore, the prerequisite "termination of VM 41" is erased.

FIG. 14 illustrates an exemplary estimation of the necessary time based on the new deployment plan. The destination PM of the VM 42 is changed from the server 1 to the server 2, so that the migration control apparatus 110 may migrate the VM 42 to the server 2 without waiting for the completion of the migration of the VM 41 to the server 1. Therefore, the execution of the new deployment plan may be completed earlier than the execution of the current deployment plan. In addition, the idle time of the server 4 increases.

Return to the discussion of FIG. 3. The server 1 includes the VM management section 19. The VM 11 and the VM 12 are running on the server 1 under management of the VM management section 19. The VM management section 19 includes the monitoring section 18. The server 2 includes the VM management section 29. The VM 21 and the VM 22 are running on the server 2 under management of the VM management section 29. The VM management section 29 includes the monitoring section 28.

The monitoring section 18 dynamically obtains the amount of transfer data, the amount of changed data, and the elapsed time of the VM during the migration, and notify them to the overall monitoring section 116 of the migration control apparatus 110. Specifically, upon receiving a monitor start request from the migration control apparatus 110, the monitoring section 18 adds information related to the target VM to the monitor list. When the migration of the target VM is completed, the monitoring section 18 deletes the information related to the target VM from the monitor list and notifies a migration completion report to the overall monitoring section 116 of the migration control apparatus 110.

Upon receiving a migration cancel request, the monitoring section 18 cancels the migration of the target VM through the VM management section 19, deletes the information related to the target VM from the monitor list, and notifies a migration cancel report to the overall monitoring section 116 of the migration control apparatus 110. Upon receiving a progress report request, the monitoring section 18 aggregates progress data of each VM included in the monitor list and notifies a progress report to the overall monitoring section 116 of the migration control apparatus 110.

Figure 16:
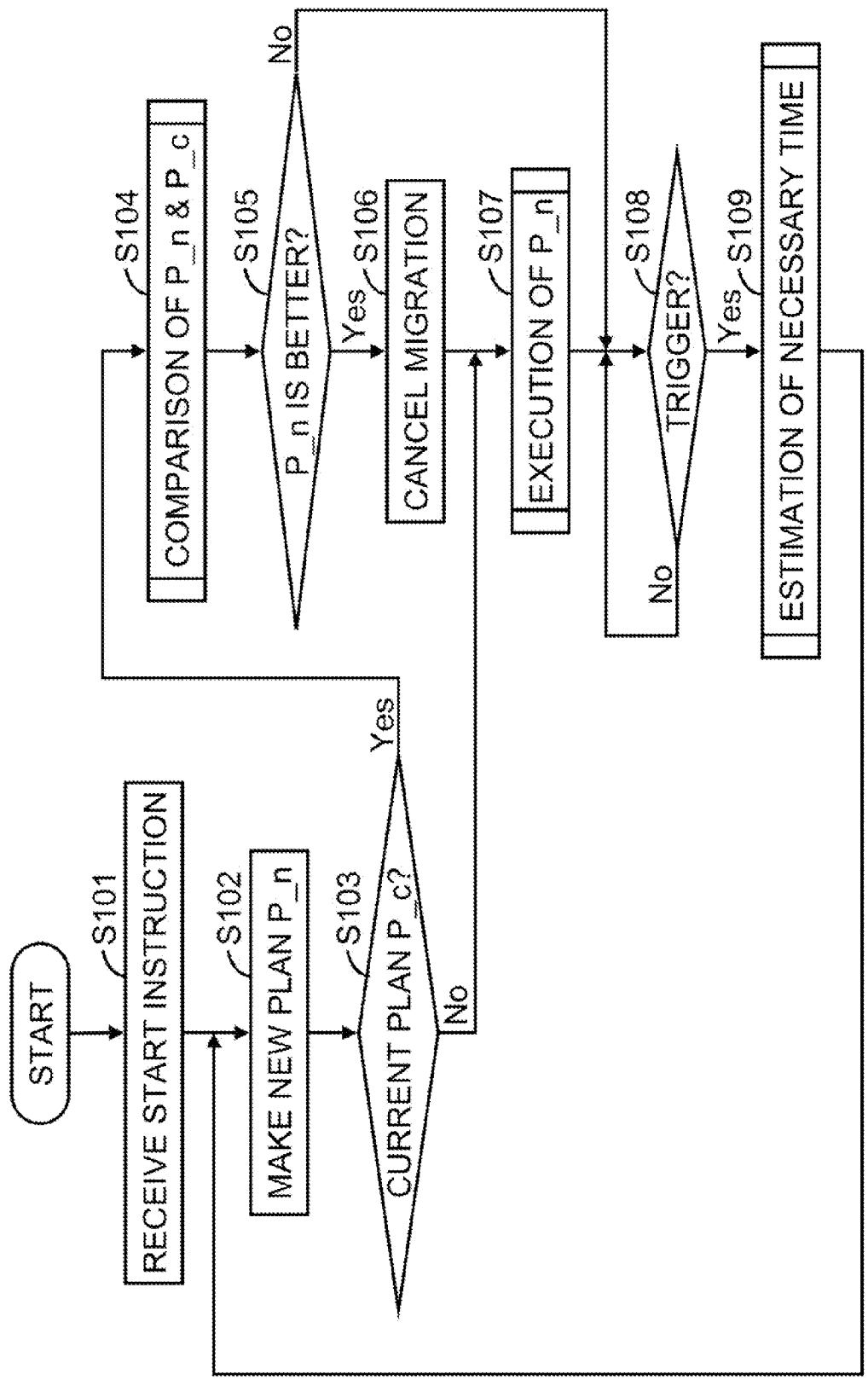
FIG. 16 is a diagram illustrating an exemplary operation flow of a migration control apparatus according to an embodiment of the present invention.
Figure 17:
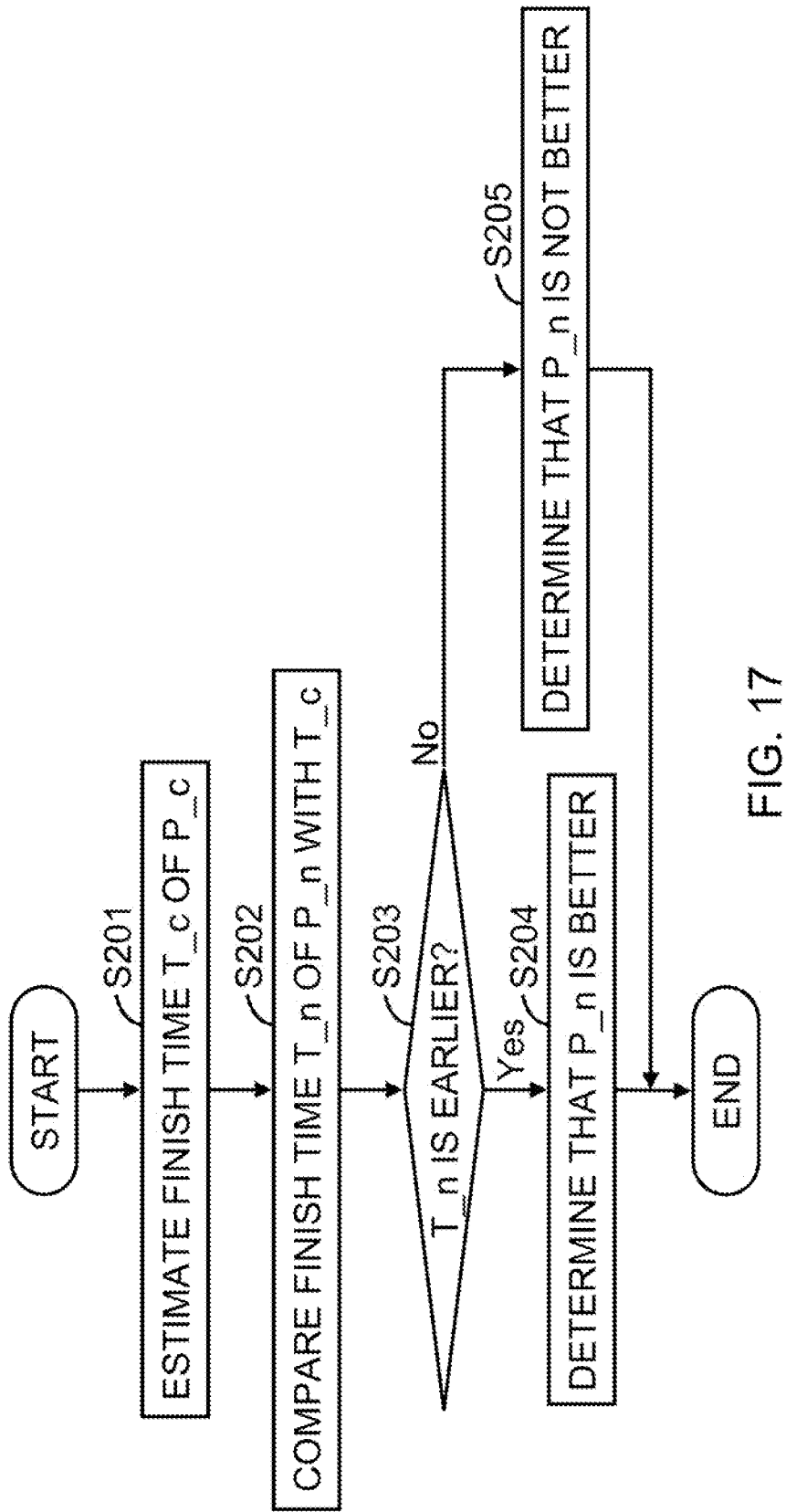
FIG. 17 is a diagram illustrating an exemplary operation flow of comparison in a migration control apparatus according to an embodiment of the present invention.
Figure 18:
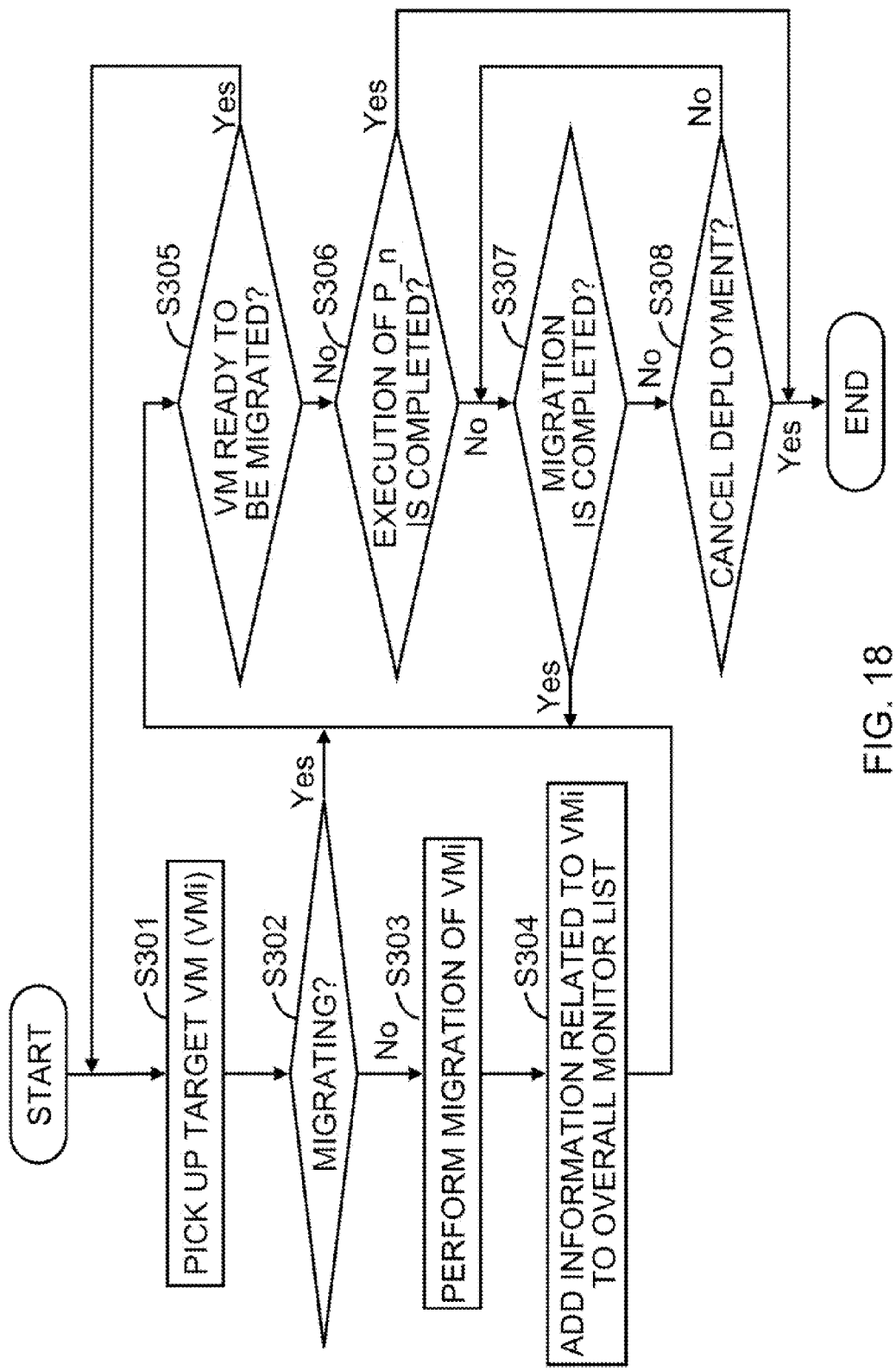
FIG. 18 is a diagram illustrating an exemplary operation flow of deployment in a migration control apparatus according to an embodiment of the present invention.
Figure 19:
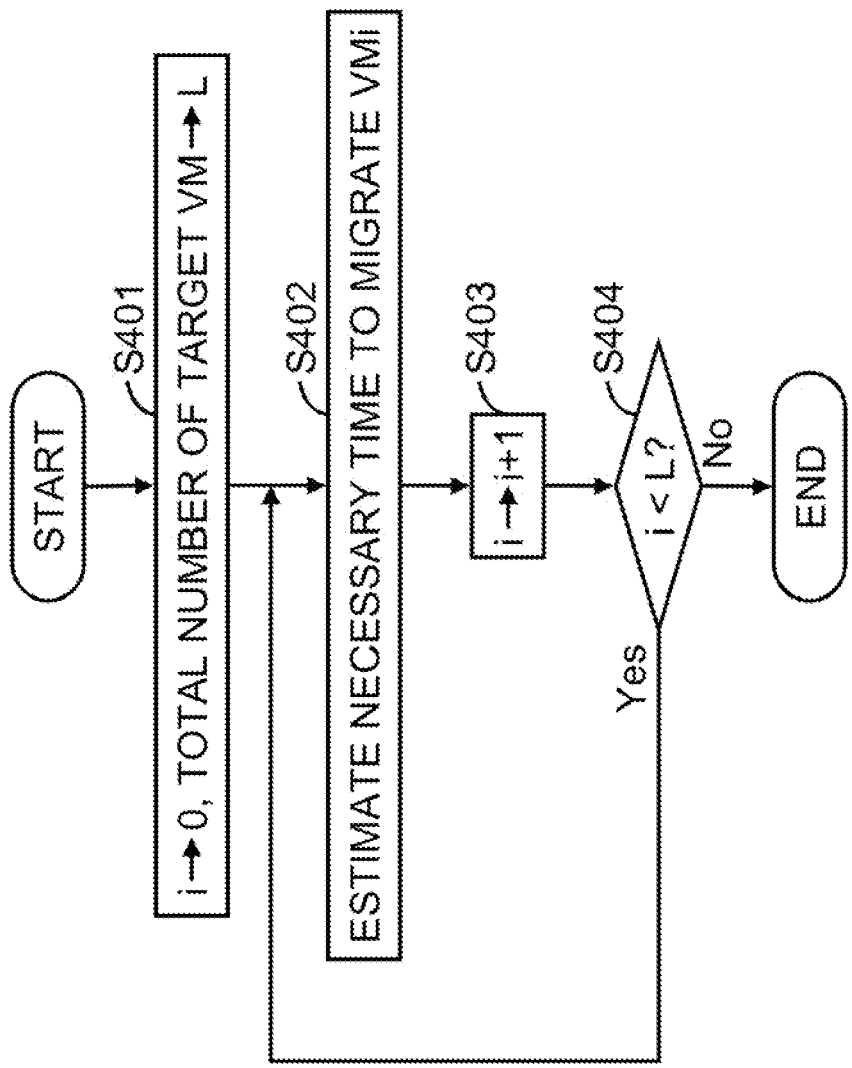
FIG. 19 is a diagram illustrating an exemplary operation flow of time estimation in a migration control apparatus according to an embodiment of the present invention.
Figure 20:
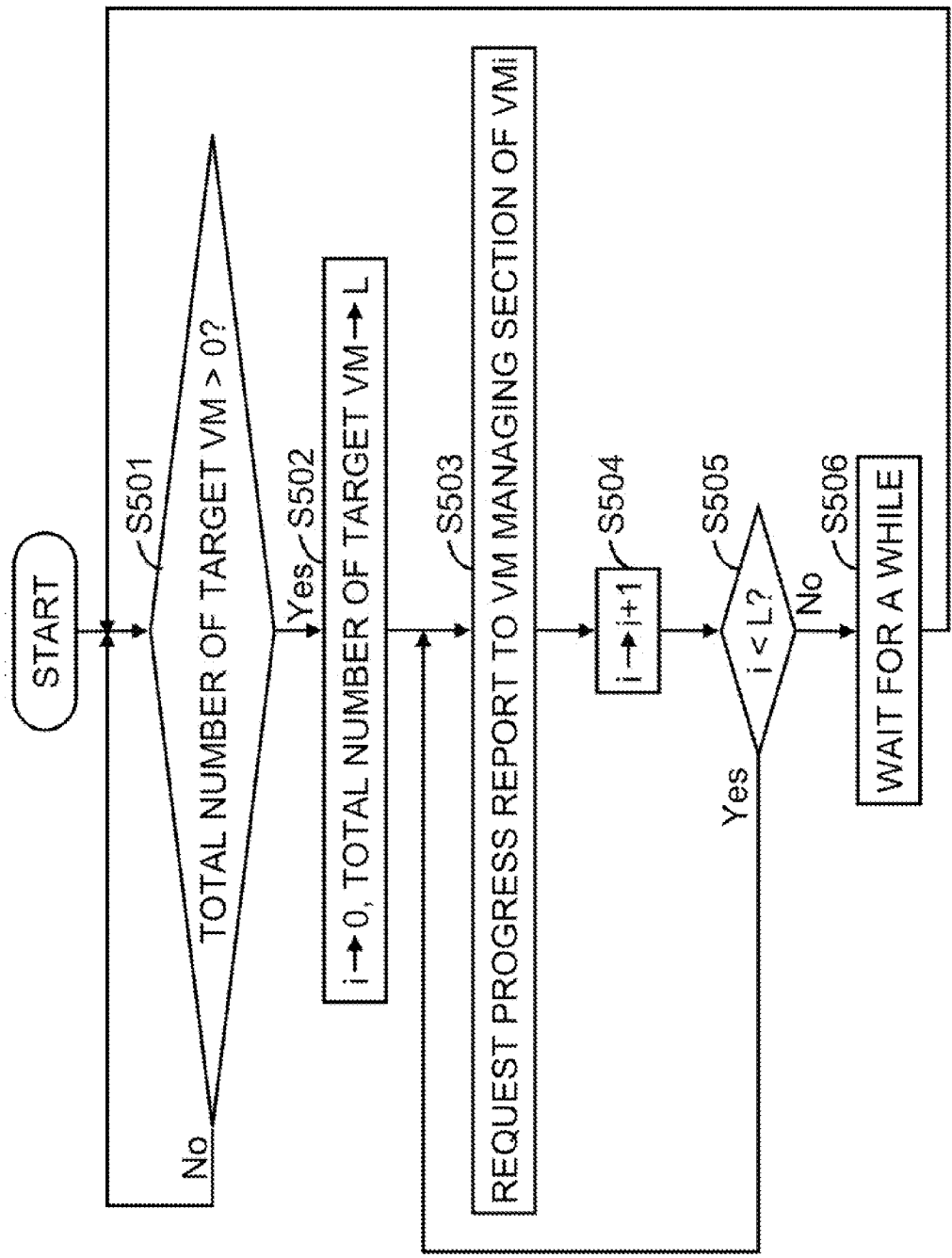
FIG. 20 is a diagram illustrating an exemplary operation flow of update of progress information in a migration control apparatus according to an embodiment of the present invention.

An operation flow of the migration control apparatus 110 according to the present embodiment will be discussed with reference to FIGS. 16 to 20. FIG. 16 illustrates an entire operation flow of the migration control apparatus. FIG. 17 illustrates an operation flow of comparison in the migration control apparatus. FIG. 18 illustrates an operation flow of the deployment in the migration control apparatus. FIG. 19 illustrates an operation flow of the time estimation in the migration control apparatus. FIG. 20 illustrates an operation flow of the update of the progress information in the migration control apparatus.

The entire operation flow of the migration control apparatus according to the present embodiment will be discussed with reference to FIG. 16.

In operation S101, the migration control apparatus 110 receives a start instruction through the management interface 111 and starts up.

In operation S102, the migration control apparatus 110 makes a new deployment plan P_n.

In operation S103, the migration control apparatus 110 determines whether there is a current deployment plan P_c. When there is no current deployment plan P_c ("No" in operation S103), the migration control apparatus 110 advances the process to operation S107.

In operation S104, when there is the current deployment plan P_c ("Yes" in operation S103), the migration control apparatus 110 compares the new deployment plan P_n with the current deployment plan P_c. This comparison will be discussed in detail below with reference to FIG. 17.

In operation S105, the migration control apparatus 110 determines whether the new deployment plan P_n is better than the current deployment plan P_c. When the new deployment plan P_n is not better than the current deployment plan P_c ("No" in operation S105), the migration control apparatus 110 advances the process to operation S108.

In operation S106, when the new deployment plan P_n is better than the current deployment plan P_c ("Yes" in operation S105), the migration control apparatus 110 cancels the migration to be cancelled.

In operation S107, the migration control apparatus 110 executes a new deployment plan P_n.

In operation S108, the migration control apparatus 110 determines whether the predetermined trigger has occurred.

In operation S108, when the predetermined trigger has occurred ("Yes" in operation S108), the migration control apparatus 110 estimates the necessary time. The estimation of the necessary time will be discussed in detail below with reference to FIG. 19.

The operation flow of comparison in the migration control apparatus according to the present embodiment will be discussed with reference to FIG. 17.

In operation S201, the migration control apparatus 110 estimates the finish time T_c of the entire deployment when the execution of the current deployment plan P_c is continued without change.

In operation S202, the migration control apparatus 110 compares the finish time T_n of the entire deployment in the new deployment plan P_n with the finish time T_c.

In operation S203, the migration control apparatus 110 determines whether the finish time T_n is earlier than the finish time T_c.

In operation S204, when the finish time T_n is earlier than the finish time T_c ("Yes" in operation S203), the migration control apparatus 110 determines that the new deployment plan P_n is better than the current deployment plan P_c, and the migration control apparatus 110 advances the process to operation S105 in FIG. 16.

In operation S205, when the finish time T_n is not earlier than the finish time T_c ("No" in operation S203), the migration control apparatus 110 determines that the new deployment plan P_n is not better than the current deployment plan P_c, and the migration control apparatus 110 advances the process to operation S105 in FIG. 16.

The operation flow of the deployment in the migration control apparatus according to the present embodiment will be discussed with reference to FIG. 18.

In operation S301, the migration control apparatus 110 picks up a target VM (VMi) to be migrated.

In operation S302, the migration control apparatus 110 determines whether the migration of the VMi is already being performed. When the migration of the VMi is already being performed ("Yes" in operation S302), the migration control apparatus 110 advances the process to operation S305.

In operation S303, when the migration of the VMi is not yet being performed ("No" in operation S302), the migration control apparatus 110 performs a live migration of the VMi through the VM control section 117.

In operation S304, the migration control apparatus 110 adds information related to the VMi to the overall monitor list.

In operation S305, the migration control apparatus 110 determines whether there is a target VM ready to be migrated. When there is a target VM ready to be migrated ("Yes" in operation S305), the migration control apparatus 110 returns the process to operation S301.

In operation S306, when there is no target VM ready to be migrated ("No" in operation S305), the migration control apparatus 110 determines whether the execution of the entire new deployment plan P_n is completed.

When the execution of the entire new deployment plan P_n is completed ("Yes" in operation S306), the migration control apparatus 110 terminates the deployment.

In operation S307, when the entire new deployment plan P_n is not completed ("No" in operation S306), the migration control apparatus 110 determines whether the migration is completed. When the migration is completed ("Yes" in operation S307), the migration control apparatus 110 returns the process to operation S305.

In operation S308, when the migration is not completed ("No" in operation S307), the migration control apparatus 110 determines whether to cancel the deployment. When the migration control apparatus 110 determines not to cancel the deployment ("No" in operation S308), the migration control apparatus 110 returns the process to operation S307. When the migration control apparatus 110 determines to cancel the deployment ("Yes" in operation S308), the migration control apparatus 110 terminates the deployment.

The operation flow of time estimation in the migration control apparatus according to the present embodiment will be discussed with reference to FIG. 19.

In operation S401, the migration control apparatus 110 initializes the value of i to "0" and sets the total number of target VMs to be migrated to L.

In operation S402, the migration control apparatus 110 estimates the necessary time to migrate the i-th VM (VMi) in the progress report.

In operation S403, the migration control apparatus 110 adds "1" to i.

In operation S404, the migration control apparatus 110 determines whether the value of i is smaller than the total number L of target VMs. When the value of i is smaller than the total number L of target VMs ("Yes" in operation S404), the migration control apparatus 110 returns the process to operation S402. When the value of i is not smaller than the total number L of target VMs ("No" in operation S404), the migration control apparatus 110 terminates the time estimation.

The operation flow of the update of the progress information in the migration control apparatus according to the present embodiment will be discussed with reference to FIG. 20.

In operation S501, the migration control apparatus 110 determines whether the total number of target VMs is greater than 0.

In operation S502, when the total number of target VMs is greater than 0 ("Yes" in operation S501), the migration control apparatus 110 initializes the value of i to "0" and sets the total number of target VMs to L.

In operation S503, the migration control apparatus 110 notifies a progress report request to the VM management section that manages VMi in the overall monitor list.

In operation S504, the migration control apparatus 110 adds "1" to i.

In operation S505, the migration control apparatus 110 determines whether the value of i is smaller than the total number L of target VMs.

When the value of i is smaller than the total number L of target VMs ("Yes" in operation S505), the migration control apparatus 110 returns the process to operation S503.

In operation S506, when the value of i is not smaller than the total number L of target VMs ("No" in operation S505), the migration control apparatus 110 waits for a while, and then returns the process to operation S501.

As discussed above, the migration control apparatus monitors a migration status of VMs running on servers, and makes a deployment plan for migrating each VM from the server on which the each VM is currently running to another server on the basis of the monitored migration status. The migration control apparatus estimates a deployment time which is the time required for all the VMs to migrate from the server on which each VM is currently running to another server when the new deployment plan is executed. Next, the migration control apparatus compares an estimated deployment time and a deployment time required when the execution of the current deployment plan is continued, and determines which finish time is earlier between the execution of the new deployment plan and the execution of the current deployment plan. When the finish time of the execution of the new deployment plan is earlier than the finish time of the execution of the current deployment plan, the migration control apparatus cancels the execution of the current deployment plan and executes the new deployment plan. Therefore, it may be possible to shorten the time required to migrate the VM even in a situation in which the number of users or the usage amount of services varies significantly.

According to the present embodiment, the migration control apparatus dynamically monitors, as a migration status of the VM, one or any combination of the amount of transfer data that is the amount of data to be migrated, the memory change ratio that is a ratio of the amount of memory data changed during the transfer in the migration to the amount of the transferred data, and the transfer throughput. The migration control apparatus makes a deployment plan for migrating the VMs from a PM on which each VM currently is running to another PM on the basis of one or any combination of the amount of transfer data, the memory change ratio, and the transfer throughput as the migration status of the monitored VMs. Therefore, it may be possible to appropriately shorten the time required to migrate the VM by dynamically monitoring parameters related to the live migration and making a deployment plan suitable to the situation.

According to the present embodiment, when a predetermined trigger occurs, the migration control apparatus recalculates the deployment time, so that it may be possible to dynamically estimate the deployment time suitable to the situation.

According to the present embodiment, the migration control apparatus recalculates the migration time when, as a predetermined trigger, any one of the following conditions is satisfied: when elapsing a predetermined time, when receiving a request for assigning a new VM, and when completing migration of a VM. Therefore, it may be possible to dynamically estimate a deployment time more suitable to the situation.

Third Embodiment

Other embodiments will be discussed.

The components of the devices illustrated in the drawings are functional elements, and need not necessarily be physically configured as illustrated in the drawings. In other words, specific forms of distribution and integration of the devices are not limited to those illustrated in the drawings, and all or part of the devices may be functionally or physically distributed or integrated in arbitrary units according to various loads and the status of use. For example, the planning section 112 and the comparing section 113 may be integrated together.

Figure 21:
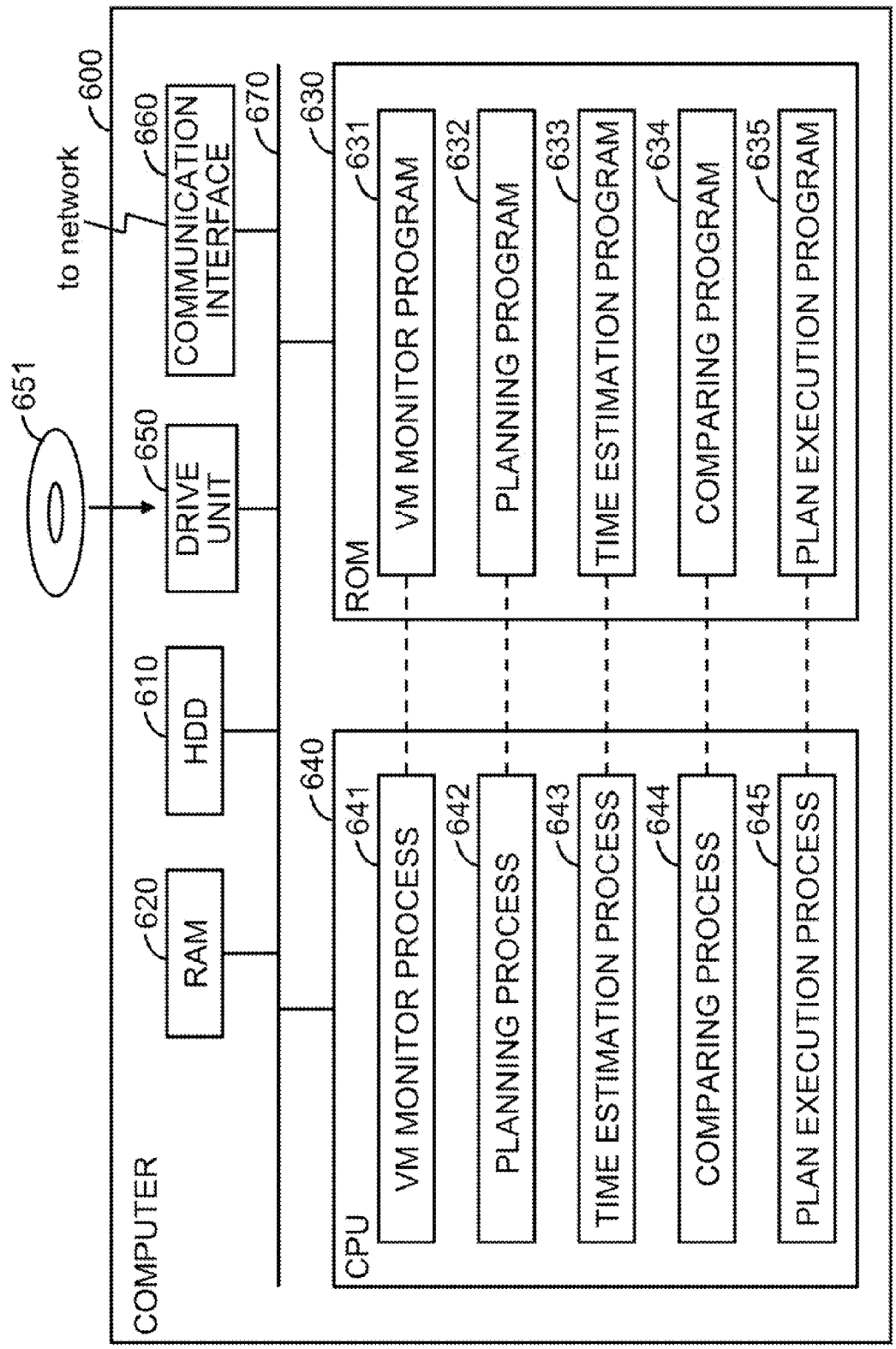
FIG. 21 is a diagram illustrating an example of a computer that executes a migration control program.
Figure 22:
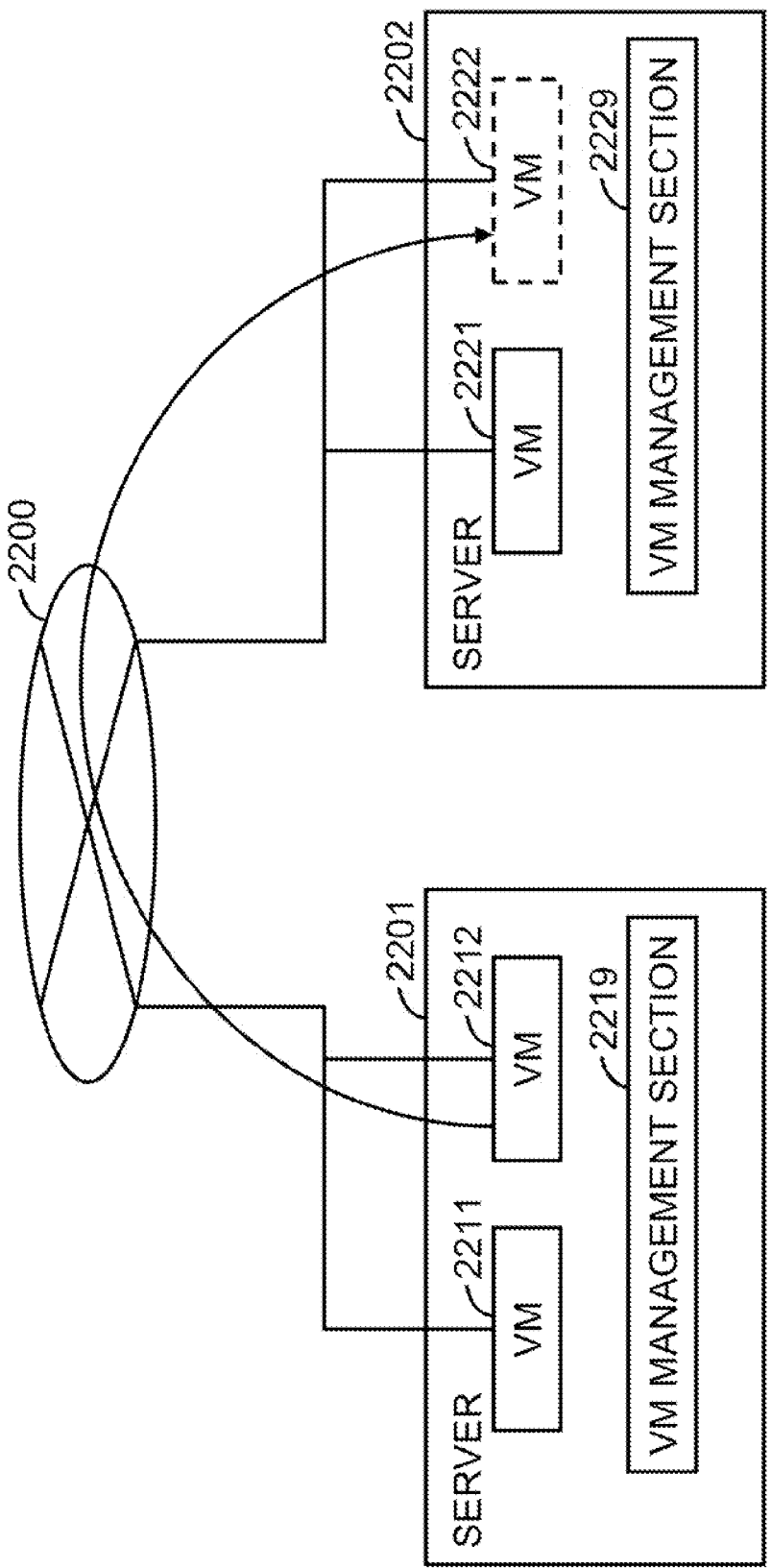
FIG. 22 is a diagram illustrating an example of a conventional live migration.
Figure 23:
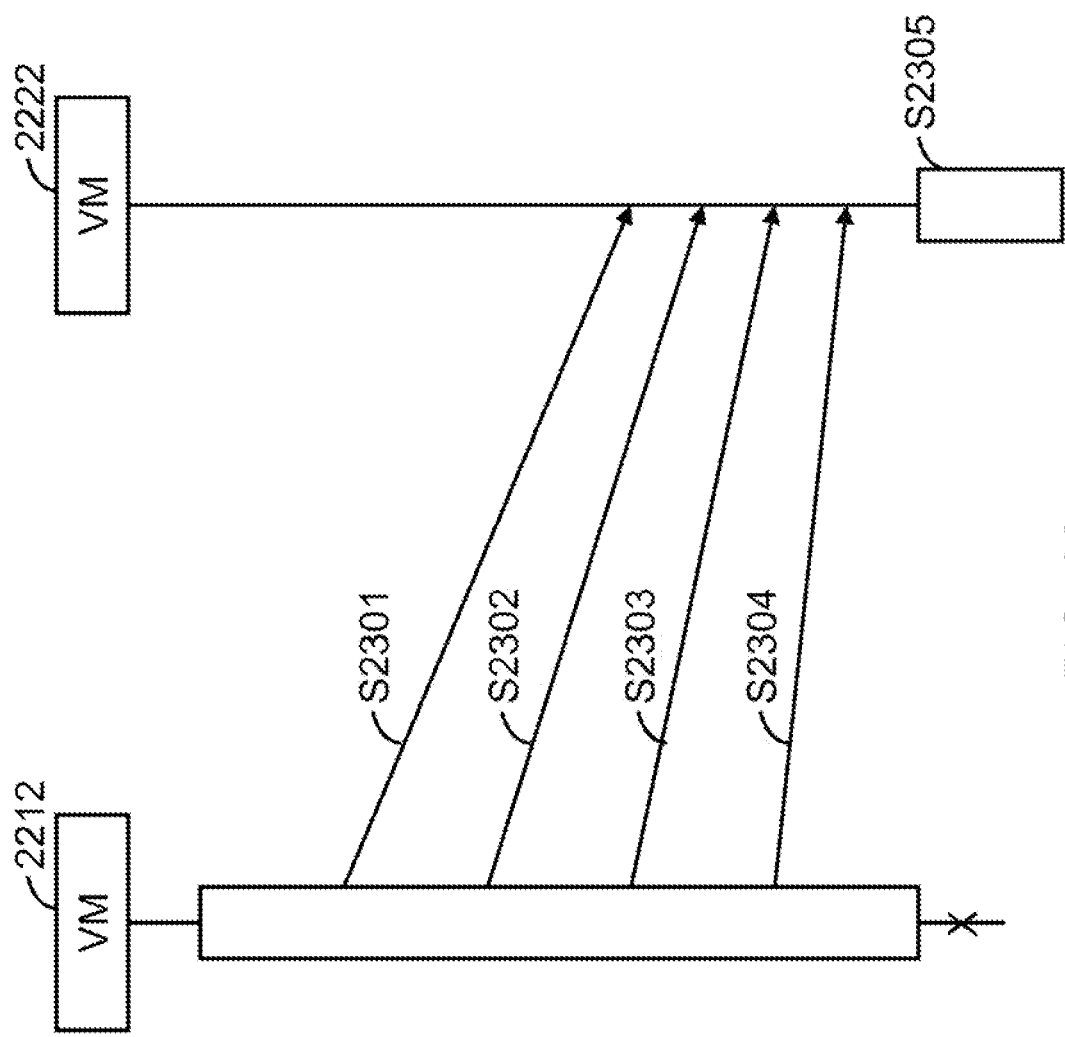
FIG. 23 is a diagram illustrating an example of operations in a conventional live migration.

The various operations discussed in the above embodiments may be realized by executing a program prepared in advance by a computer. Therefore, an example of a computer that executes a program describing the same functions as those of the above embodiments will be discussed below. FIG. 21 illustrates an example of a computer that executes a migration control program.

As illustrated in FIG. 21, a computer 600 as a migration control apparatus includes, for example, a hard disk drive (HDD) 610, a random access memory (RAM) 620, a read only memory (ROM) 630, a CPU 640, a drive unit 650 for a removable disk 651, and a communication interface 660 for connecting to a network, which are connected to each other by a bus 670.

The ROM 630 stores a migration control program that describes the same functions as those of the above embodiments in advance. Specifically, as illustrated in FIG. 21, the ROM 630 stores in advance a VM monitor program 631, a planning program 632, a time estimation program 633, a comparing program 634, and a plan execution program 635. The programs 631 to 635 may be appropriately distributed or integrated in the same manner as the components of the migration control apparatus illustrated in FIG. 3.

When the CPU 640 reads and executes the programs 631 to 635 from the ROM 630, the programs 631 to 635 cause the CPU 640 to perform a VM monitor process 641, a planning process 642, a time estimation process 643, a comparing process 644, a plan execution process 645, as illustrated in FIG. 21. The processes 641 to 645 correspond respectively to the overall monitoring section 116, the planning section 112, the time estimation section 115, the comparing section 113, and the plan execution section 114 illustrated in FIG. 3. The programs 631 to 635 may be stored in the HDD 610, loaded into the RAM 620, and executed. The programs 631 to 635 may be installed in the HDD 610 from the network via the communication interface 660. The programs 631 to 635 may be stored in the removable disk 651 that is computer-readable and not temporary, distributed, and installed in the HDD 610 from the drive unit 650.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A migration control apparatus for controlling migration of a virtual machine, the migration control apparatus comprising:
a processor to:
monitor a status of a current migration of the virtual machine running on a first physical machine, the current migration being performed in accordance with a current migration plan;
make, on the basis of the status of the current migration and while the current migration is being performed, a new migration plan for migrating the virtual machine from the first physical machine to a second physical machine, the new migration plan includes reducing power consumption by aggregating virtual machines in a smaller number of physical machines to terminate physical machines on which no virtual machine is running and which are estimated to consume only constant amount of power;
estimate a first migration time required to perform a new migration in accordance with the new migration plan;
compare the first migration time with a second migration time to determine which migration will be completed earlier between the new migration and the current migration, the second migration time being an estimated time required to complete the current migration; and
perform the new migration when it has been determined that the new migration will be completed earlier.

2. The migration control apparatus according to claim 1, wherein the status of the current migration is anyone of an amount of memory data to be copied by data transfer in the current migration, a ratio of memory data changed during the data transfer, and a throughput of the data transfer.

3. The migration control apparatus according to claim 1, wherein the processor estimates the first migration time in response to a predetermined trigger.

4. The migration control apparatus according to claim 3, wherein the predetermined trigger is one of elapsing a predetermined time period, receiving request for assigning a new virtual machine, and
completing a migration of any virtual machine.

5. A migration control method executed by a migration control apparatus for controlling migration of a virtual machine, the migration control method comprising:
monitoring a status of a current migration of the virtual machine running on a first physical machine, the current migration being performed in accordance with a current migration plan;
making, on the basis of the status of the current migration and while the current migration is being performed, a new migration plan for migrating the virtual machine from the first physical machine to a second physical machine, the new migration plan includes reducing power consumption by aggregating virtual machines in a smaller number of physical machines to terminate physical machines on which no virtual machine is running and which are estimated to consume only constant amount of power;
estimating a first migration time required to perform a new migration in accordance with the new migration plan;
comparing, by the migration control apparatus, the first migration time with a second migration time to determine which migration will be completed earlier between the new migration and the current migration, the second migration time being an estimated time required to complete the current migration; and
performing the new migration when it has been determined that the new migration will be completed earlier.

6. A non-transitory computer-readable storing medium storing a program causing a computer for controlling migration of a virtual machine to execute:
monitoring a status of a current migration of the virtual machine running on a first physical machine, the current migration being performed in accordance with a current migration plan;
making, on the basis of the status of the current migration and while the current migration is being performed, a new migration plan for migrating the virtual machine from the first physical machine to a second physical machine, the new migration plan includes reducing power consumption by aggregating virtual machines in a smaller number of physical machines to terminate physical machines on which no virtual machine is running and which are estimated to consume only constant amount of power;
estimating a first migration time required to perform a new migration in accordance with the new migration plan;
comparing the first migration time with a second migration time to determine which migration will be completed earlier between the new migration and the current migration, the second migration time being an estimated time required to complete the current migration; and
performing the new migration when it has been determined that the new migration will be completed earlier.

* * * * *